United States Patent [19]

Nilssen

[11] Patent Number: 4,924,150
[45] Date of Patent: May 8, 1990

[54] POWER-LINE CONTROL SYSTEM

[76] Inventor: Ole K. Nilssen, Caesar Dr., Rte. 5, Barrington, Ill. 60010

[21] Appl. No.: 224,178

[22] Filed: Jul. 22, 1988

Related U.S. Application Data

[63] Continuation of Ser. No. 7,481, Jan. 28, 1987, abandoned.

[51] Int. Cl.$^5$ .......................................... H05B 41/16
[52] U.S. Cl. ............................. 315/244; 315/DIG. 5; 315/225; 315/194; 315/176; 315/307; 315/246
[58] Field of Search .................. 315/171–176, 315/224, 225, 243, 244, 307, 308, DIG. 5, DIG. 7, 194, 246

[56] References Cited

U.S. PATENT DOCUMENTS

| | | | |
|---|---|---|---|
| 3,525,015 | 8/1970 | Kita | 315/194 X |
| 4,042,856 | 8/1977 | Steigerwald | 315/246 |
| 4,352,045 | 9/1982 | Widmayer | 315/240 X |
| 4,528,457 | 9/1985 | Keefe et al. | 363/132 X |
| 4,651,060 | 3/1987 | Clark | 315/194 X |
| 4,700,113 | 10/1987 | Stupp et al. | 315/DIG. 2 X |
| 4,791,338 | 12/1988 | Dean et al. | 315/307 X |

Primary Examiner—James J. Groody
Assistant Examiner—Mark P. Powell

[57] ABSTRACT

A full-bridge transistor inverter is connected at its DC supply-side with an energy-storing capacitor. The inverter's output terminals are connected in series between a source of AC voltage and a load; which load may be an electric motor, a fluorescent lighting system, etc. By controllably switching the transistors of the inverter ON and OFF in synchronism with the frequency of the AC voltage, effective control of the flow of power between the AC source and the load is achieved. DC voltage on the energy-storing capacitor is obtained from the AC source by way of the timing of the switching action of the inverter.

Hence, in contrast with the ordinary situation where an inverter is supplied with net power from its source of DC voltage and where this net power is then supplied to a load connected with the inverter's output, the present invention relates to a situation where no net power is supplied to the inverter from its source of DC voltage and where no net power is supplied from the inverter's output. Instead, the inverter is used for controlling the waveform of the alternating current flowing through it by way of its output terminals.

24 Claims, 3 Drawing Sheets

POWER-LINE CONTROL SYSTEM

This application is a continuation of application Ser. No. 07/007,481, filed Jan. 28, 1987, now abandoned.

BACKGROUND OF THE INVENTION

1. Field of the Invention

The present invention relates to a two-terminal means by which to control the flow of power between a source of AC voltage and a load, particularly in situations wherein the load comprises an inductive component.

2. Elements of Prior Art

At present, the most commonly used two-terminal means for controlling the flow of power between an AC source and a load is that of a phase-controlled Triac, such as is used in most ordinary light dimmers.

However, when the load comprises a significant inductive component, such as is typically the case with a load consisting of an electric motor or a fluorescent lighting system, the ordinary series-connected two-terminal Triac controller is not very effective.

In fact, due to reasons of poor power factor, the ordinary phase-controlled Triac is not that appropriate even for most resistive loads.

SUMMARY OF THE INVENTION

Objects of the Invention

A general object of the present invention is that of providing for a means by which to control the flow of power between a source of AC voltage and a load.

A more specific object is that of providing for a two-terminal control means operable to be used in series-connection between a source of AC voltage and a load, and to control the flow of power between the source and the load, even if the load comprises a significant inductive component.

These as well as other objects, features and advantages of the present invention will become apparent from the following description and claims.

Brief Description

In its preferred embodiment, the present invention constitutes a control means having but two terminals and being operable: (i) to be connected in series between a source of AC voltage and a load, and (ii) adjustably to control the flow of power between this source of AC voltage and the load.

The control means comprises a full-bridge transistor inverter having its bridge output connected directly with the two terminals of the control means. The inverter's DC supply side is connected with an energy-storing capacitor; which capacitor is comprised within the control means.

By controllably switching the transistors of the inverter ON and OFF in synchronism with the frequency of the AC voltage, effective control of the flow of current between the AC source and the load is achieved. DC voltage on the energy-storing capacitor is obtained from the AC source by way of the timing of the switching action of the inverter.

Hence, in contrast with the ordinary situation where an inverter is supplied with net power from a source of DC voltage and where this net power is then supplied to a load connected with the inverter's output, the present invention relates to a situation where no net power is supplied to the inverter from its source of DC voltage and where no net power is supplied from the inverter's output. Instead, on an on-going instantaneous basis, by selectably adding/subtracting the DC voltage on the energy-storing capacitor to/from the line voltage, the inverter is used for controlling the waveshape of the alternating current flowing through its output terminals.

In an example, the present invention is used for controlling the waveshape of the current flowing between an ordinary 277Volt/60Hz electric utility power line and a fluorescent lighting system, thereby to improve the current crest-factor and thereby the overall luminous efficacy of the lighting system.

In this, as well as in other applications, as long as the load comprises a significant inductive component, by providing for non-synchronous operation of the inverter, subject control means effectively permits modifying the voltage provided to the load such as to cause the resulting load current to be of nearly any desired waveshape and/or frequency.

DESCRIPTION OF THE PREFERRED EMBODIMENT

Details of Construction

Figure 1:
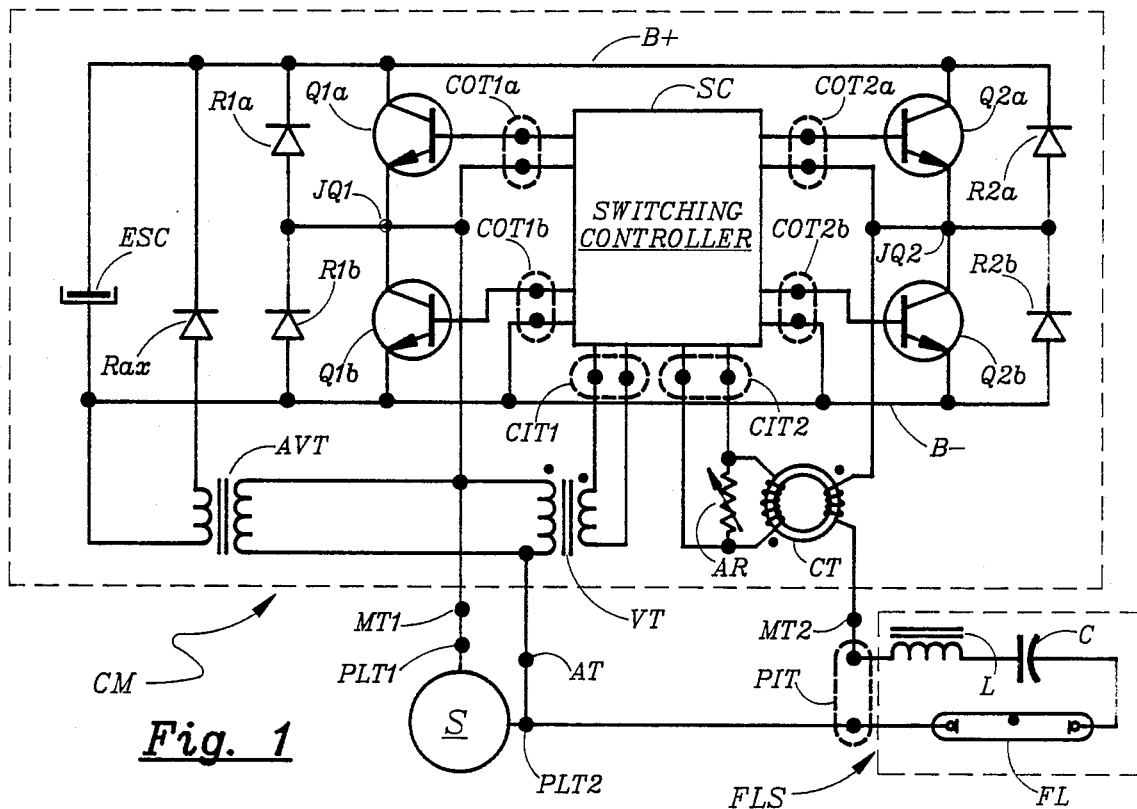
FIG. 1 schematically illustrates a three-terminal embodiment of the control means of the present invention.

In FIG. 1, a source S provides a 277 Volt/60Hz voltage between power line terminals PLT1 and PLT2; which power line terminals are connected with power input terminals PIT of a fluorescent lighting system FLS by way of main terminals MT1 and MT2 of control means CM; terminal MT1 being connected directly with terminal PLT1.

Fluorescent lighting system FLS is represented as a series-combination of an inductor L, a capacitor C, and a fluorescent lamp FL.

Inside control means CM is an energy-storing capacitor ESC connected between a B+ bus and a B− bus.

A first transistor Q1a is connected with its collector to the B+ bus and with its emitter to a first junction JQ1; a second transistor Q1b is connected with its collector to junction JQ1 and with its emitter to the B− bus; a third transistor Q2a is connected with its collector to the B+ bus and with its emitter to a junction JQ2; and a fourth transistor Q2b is connected with its collector to junction JQ2 and with its emitter to the B− bus.

A first rectifier R1a is connected with its cathode to the B+ bus and with its anode to junction JQ1; a second rectifier R1b is connected with its cathode to junction JQ1 and with its anode to the B− bus; a third rectifier R2a is connected with its cathode to the B+ bus and with its anode to junction JQ2; and a fourth rectifier R2b is connected with its cathode to junction JQ2 and with its anode to the B− bus.

Main terminal MT1 is connected directly with junction JQ1; and main terminal MT2 is connected with junction JQ2 by way of the primary winding of a current transformer CT.

A switching controller SC has four pairs of control output terminals: COT1a, COT1b, COT2a and COT2b.

Control output terminals COT1a are connected across the base-emitter junction of transistor Q1a; control output terminals COT1b are connected across the base-emitter junction of transistor Q1b; control output terminals COT2a are connected across the base-emitter junction of transistor Q2a; and control output terminals COT2b are connected across the base-emitter junction of transistor Q2b.

Switching controller AC also has two pairs of control input terminals: CIT1 and CIT2.

Control input terminals CIT2 are connected across the secondary winding of current transformer CT, as is also an adjustable resistor AR. Control input terminals CIT1 are connected across the secondary winding of a voltage transformer VT, whose primary winding is connected between main terminal MT1 and an auxiliary terminal AT; which auxiliary terminal is connected directly with power line terminal PLT2.

An auxiliary voltage transformer AVT is connected with its primary winding between auxiliary terminal AT and main terminal MT1. Its secondary winding is connected between the B— bus and the anode of an auxiliary rectifier Rax. The cathode of rectifier Rax is connected with the B+ bus.

Figure 2:
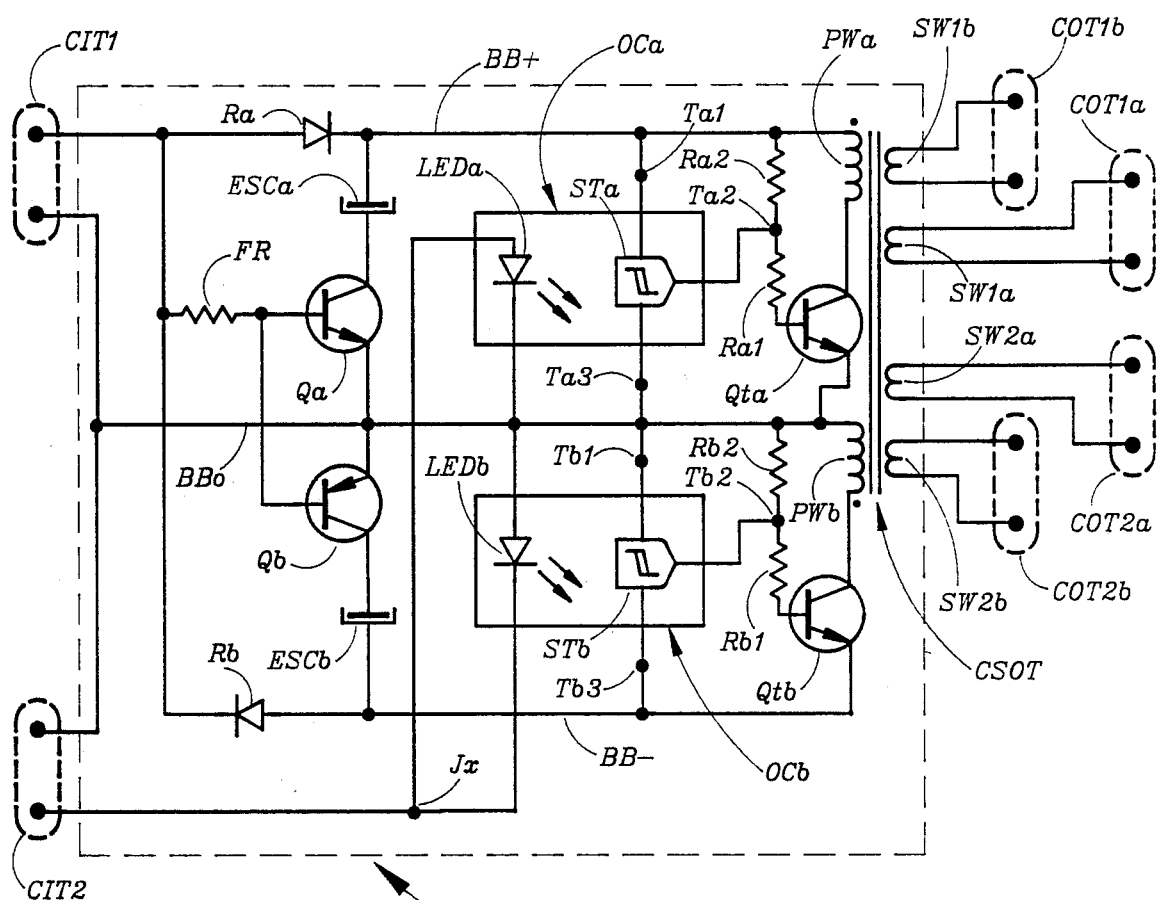
FIG. 2 schematically illustrates the programmer means used in the control means of FIG. 1.

FIG. 2 illustrates details of switching controller SC of FIG. 1.

In FIG. 2, one of control input terminals CIT1 is connected with a neutral bus BBo; the other of control input terminals CIT1 is connected with the anode of a first rectifier Ra as well as with the cathode of a second rectifier Rb. The cathode of rectifier Ra is connected with a positive bus BB+; and the anode of rectifier Rb is connected with a negative bus BB—.

A first energy-storing capacitor ESCa is connected between the BB+ bus and the collector of an NPN transistor Qa, whose emitter is connected with the BBo bus. The base of transistor Qa is connected to the anode of rectifier Ra by way of a fixed resistor FR.

A second energy-storing capacitor ESCb is connected between the BB— bus and the collector of a PNP transistor Qb, whose emitter is connected with the BBo bus. The base of transistor Qa is directly connected with the base of transistor Qb.

A first opto-coupler OCa comprises a first light-emitting diode LEDa and a first Schmitt trigger STa; and a second opto-coupler OCb comprises a second light-emitting diode LEDb and a second Schmitt trigger STb.

Light-emitting diode LEDa is connected with its cathode to the BBo bus and with its anode to a junction Jx. Light-emitting diode LEDb is connected with its anode to the BBo bus and with its cathode to junction Jx.

Control input terminals CIT2 are connected between the BBo bus and junction Jx.

Schmitt trigger STa has three terminals: Ta1, Ta2 and Ta3; and Schmitt trigger STb has three terminals: Tb1, Tb2 and Tb3. The outputs from Schmitt triggers STa and STb are provided between terminal pairs Ta2/Ta3 and Tb2/Tb3, respectively.

Terminal Ta1 is connected with the BB+ bus; terminal Ta2 is connected with the base of a transistor Qta by way of a resistor Ra1; and terminal Ta3 is connected with the BBo bus. A resistor Ra2 is connected between terminals Ta1 and Ta2.

Terminal Tb1 is connected with the BBo bus; terminal Tb2 is connected with the base of a transistor Qtb by way of a resistor Rb1; and terminal Tb3 is connected with the BB— bus. A resistor Rb2 is connected between terminals Tb1 and Tb2.

A control signal output transformer CSOT has first and second primary windings PWa and PWb. Primary winding PWa is connected between the BB+ bus and the collector of transistor Qta; and primary winding PWb is connected between the BBo bus and the collector of transistor Qtb.

Transformer CSOT has four secondary windings: SW1a, SW1b, SW2a and SW2b. Secondary winding SW1a is connected with control output terminals COT1a; secondary winding SW1b is connected with control output terminals COT1b; secondary winding SW2a is connected with control output terminals COT2a; and secondary winding SW2b is connected with control output terminals COT2b.

Figure 3:
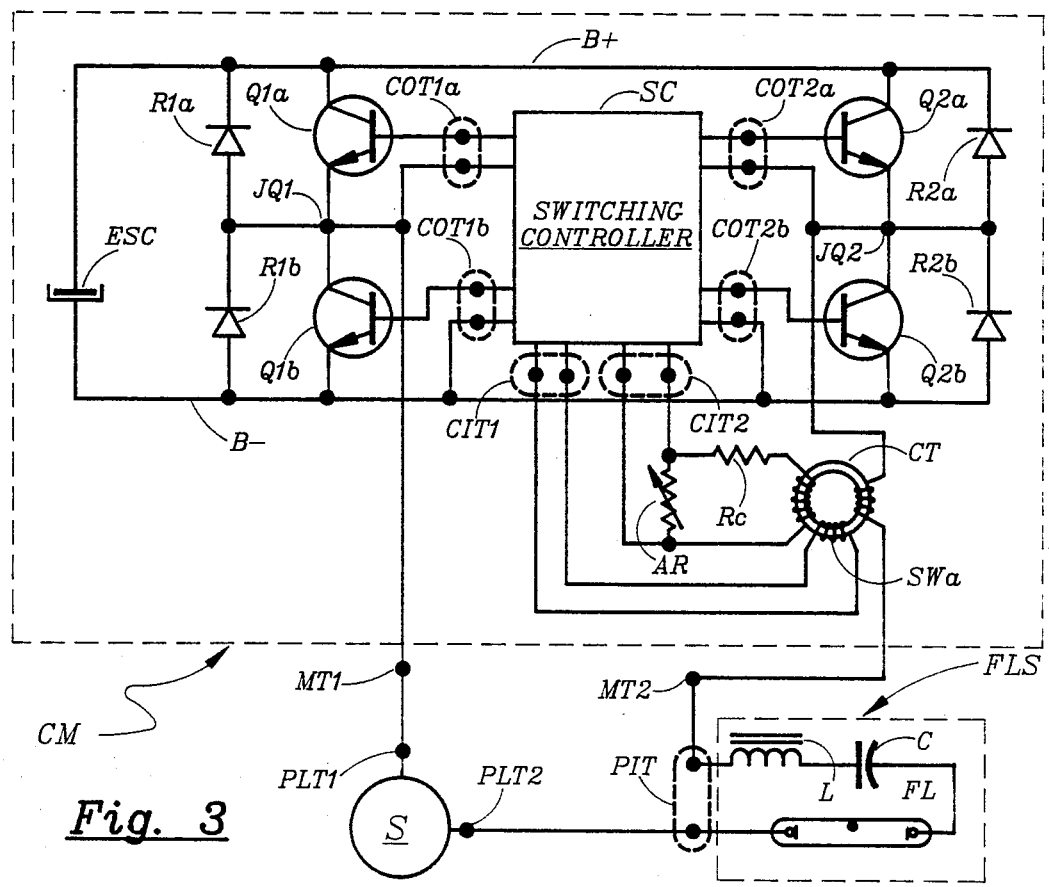
FIG. 3 schematically illustrates the preferred two-terminal embodiment of the control means.

FIG. 3 is the same as FIG. 1 except for: (i) the addition of a resistor Rc in series with the original secondary winding of current transformer CT, and (ii) the elimination of auxiliary voltage transformer AVT, auxiliary rectifier Rax, auxiliary terminal AT, and voltage transformer VT.

In FIG. 3, instead of being obtained from voltage transformer VT, the AC voltage required at control input terminals CIT1 of switching controller SC is provided from an additional secondary winding SWa on current transformer CT.

Details of Operation

Figure 4:
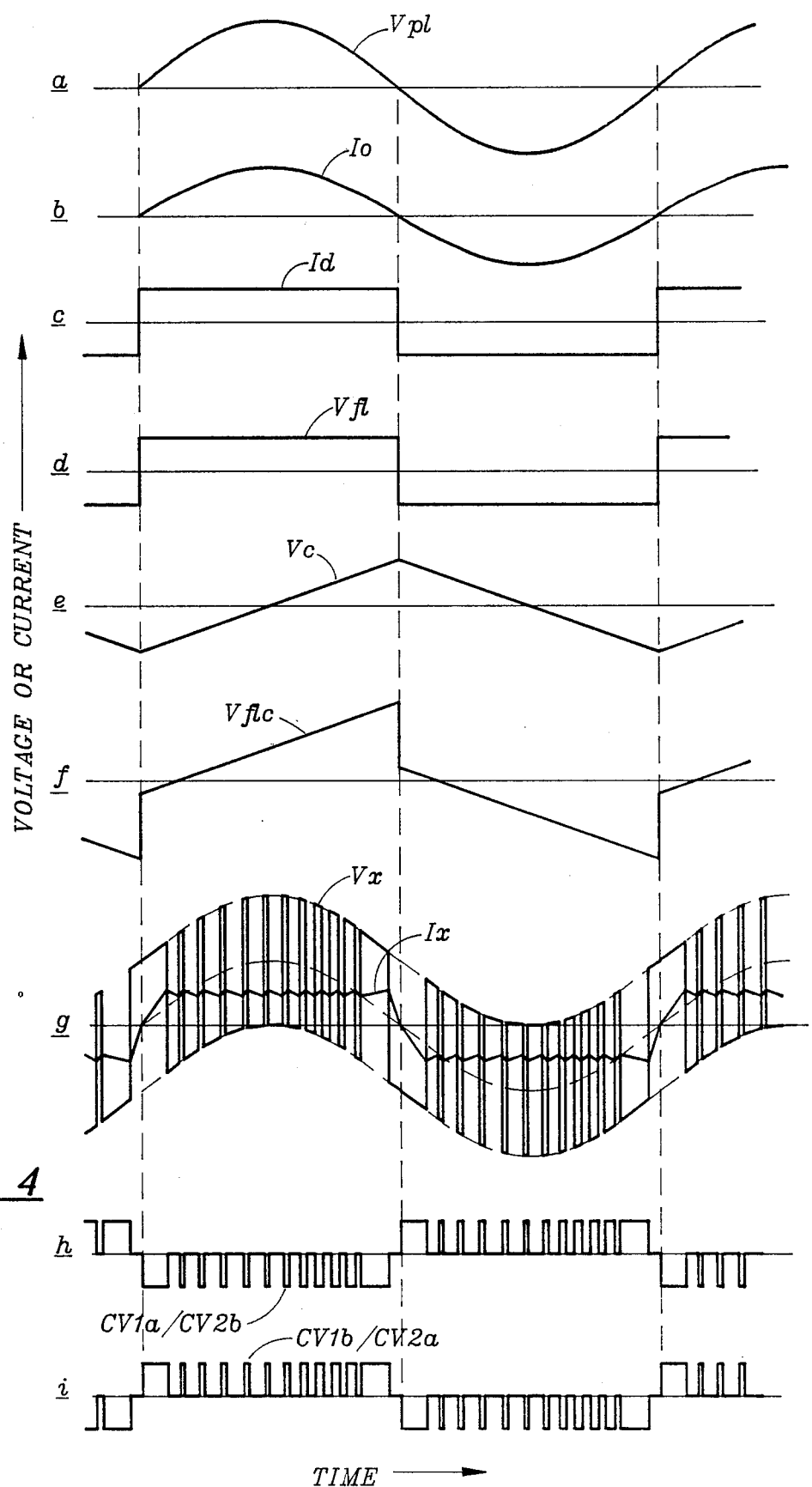
FIG. 4 illustrates various voltage and current waveforms associated with the control means of FIGS. 1 and 3.

The operation of the circuits of FIGS. 1, 2 and 3 may best be understood when reading the following explanation in light of the waveforms illustrated by FIG. 4.

In FIG. 4a, the waveform identified as Vp1 represents the voltage provided by the power line voltage source S of FIG. 1.

In FIG. 4b, the waveform identified as Io represents the current flowing into power input terminals POT of fluorescent lighting system FLS of FIG. 1 whenever control means CM provides for a continuous short circuit between main terminals MT1 and MT2. Thus, the waveform of FIG. 4b represents the current that would have been flowing from power line source S and into the fluorescent lighting system if control means CM were to have been replaced with a short circuit.

In FIG. 4c, the waveform identified as Id represents the desired waveform for the current flowing into power input terminals POT of fluorescent lighting system FLS, and thereby through inductor L, capacitor C and fluorescent lamp FL.

In FIG. 4d, the waveform identified as Vf1 represents the voltage across fluorescent lamp FL resulting from the current of FIG. 4c.

In FIG. 4e, the waveform identified as Vc represents the voltage across capacitor C resulting from the current of FIG. 4c.

In FIG. 4f, the waveform identified as Vflc represents the sum of the voltages present across fluorescent lamp FL and capacitor C; which is to say: the sum of the voltages depicted by FIGS. 4d and 4e.

In FIG. 4g, the waveform identified as Vx represents a voltage that, if provided across power input terminals PIT of fluorescent lighting system FLS, would give rise to a current therethrough having the waveshape indicated by Ix.

Thus, the actual current (Ix) flowing into the fluorescent lighting system (FLS) in response to the net voltage (Vx) provided across power input terminals PIT fairly well approximates the desired waveform as depicted in FIG. 4c; which implies that the graphic representations of FIGS. 4d, 4e and 4f are all reasonable approximations of the actual waveforms.

In FIG. 4h, the waveform identified as CV1a/CV2b represents both the control voltages provided by switching controller SC at its control output terminal pairs COT1a and COT2b; which are the control voltages provided to the base-emitter junctions of transistors Q1a and Q2b.

In FIG. 4i, the waveform identified as CV1b/CV2a represents both the control voltages provided by switching controller SC at its control output terminal pairs COT1b and COT2a; which are the control voltages provided to the base-emitter junctions of transistors Q1b and Q2a.

Now, with reference to the waveforms of FIG. 4 and the circuit diagram of FIG. 2, the operation of the power line control means of FIG. 1 may be explained as follows.

In FIG. 1, the current flowing into the fluorescent lighting system FLS also flows through the primary winding of current transformer CT. Thus, the secondary winding of current transformer CT provides a secondary current of instantaneous magnitude proportional to that of the current flowing into fluorescent lighting system FLS.

Except for an adjustable amount shunted away by adjustable resistor AR, this secondary current flows into control input terminals CIT2 of switching controller SC and through one or the other of light-emitting diodes LEDa/LEDb, thereby causing the one or the other of these diodes to emit (infrared) light of intensity roughly proportional to the magnitude of the current flowing into fluorescent lighting system FLS.

For a situation where load current is flowing from power line terminal PLT1, into main terminal MT1, out of main terminal MT2, through fluorescent lighting system FLS, and back to power line terminal PLT2, the polarities of the windings of transformers CT and VT are so arranged as to provide: (i) for the voltage present at the anode of rectifier Ra to be positive with respect to the BBo bus, which means that transistor Qa receives forward base bias, thereby to be rendered conductive (which means that transistor Qb will be rendered non-conductive), and (ii) for the secondary current from current transformer CT to flow through light-emitting diode LEDa, thereby to cause coupling with Schmitt trigger STa.

Now, if the magnitude of the current flowing through light-emitting diode LEDa is below a certain threshold level, Schmitt trigger STa receives an inadequate amount of light to become activated; which means that transistor Qta will be conductive, thereby to cause the DC voltage on energy-storing capacitor ESCa to be applied across primary winding PWa of transformer CSOT.

With the DC voltage from capacitor ESCa applied across primary winding PWa, forward (positive) base voltages/currents will be supplied to the bases of transistors Q1b and Q2a, thereby to render these transistors conductive. With these transistors conductive, the load current flowing into main terminal MT1 will flow through transistor Q1b to the negative side of energy-storing capacitor ESC (i.e., to the B− bus), from the positive side of energy-storing capacitor ESC (i.e., from the B+ bus), through transistor Q2a, and out of main terminal MT2.

Thus, the DC voltage present on energy-storing capacitor ESC will aid in causing the load current to flow, thereby causing it to increase in magnitude.

However, after a brief period, the magnitude of the load current will have increased enough to cause the intensity of the light provided by light-emitting dioded LEDa to Schmitt trigger STa to reach a level high enough to cause Schmitt trigger STa to become activated, thereby: (i) to cause transistor Qta to become non-conductive, and (ii) to remove the forward (positive) base voltages/currents from transistors Q1b and Q2a.

Thus, as soon as the magnitude of the load current increases enough to cause the magnitude of the current flowing through light-emitting diode LEDa to reach said certain threshold, transistors Q1b and Q2a become non-conductive; whereafter the load current will flow from main terminal MT1, through rectifier R1a, to the positive side of energy-storing capacitor ESC (i.e., to the B+ bus), from the negative side of energy-storing capacitor ESC (i.e., from the B− bus), through rectifier R2b, and out of main terminal MT2.

Thus, in this case, the load current will be forced to charge energy-storing capacitor ESC; which means that the DC voltage present on energy-storing capacitor ESC will impede the flow of load current, thereby causing its magnitude to decrease.

After a brief period, the magnitude of the load current will have decreased enough to cause the intensity of the light provided by light-emitting diode LEDa to Schmitt trigger STa to reach a level low enough to cause Schmitt trigger STa to become de-activated, thereby: (i) to cause transistor Qta to become conductive again, and (ii) to re-instate the forward (positive) base voltages/currents to transistors Q1b and Q2a.

In other words, the magnitude of the load current will be automatically controlled as indicated by the initial full half-cycle of the Ix waveform of FIG. 4g; and the voltages/currents correspondingly provided to transistors Q1b and Q2a will be as indicated by FIG. 4i.

As indicated by the Vx waveform of FIG. 4g, the corresponding net voltage provided across the PIT terminals of the fluorescent lighting system will be the instantaneous sum of the power line voltage of FIG. 4a and the substantially squarewave voltage provided across main terminals MT1/MT2 of the control circuit—the peak absolute magnitude of this squarewave voltage being substantially equal to that of the DC voltage on energy-storing capacitor ESC.

For a situation where the load current is flowing in a direction opposite of that described above, the results are identical but obverse. That is: (i) transistor Qb will be rendered conductive while transistor Qa will be rendered non-conductive, (ii) the load current will activate light-emitting diode LEDb (instead of light-emitting diode LEDa), which will control Schmitt trigger STb, (iii) Schmitt trigger STb will control transistor Qtb, and (iv) transistor Qtb will operate to connect and disconnect the DC voltage on energy-storing capacitor ESCb with and from primary winding PWb of transformer CSOT, thereby to provide to transistors Q1a and Q2b the base voltages/currents indicated by the waveforms of FIG. 4h.

Hence, on a continuous basis, the load current will be as indicated by waveform Ix of FIG. 4g; and the voltage provided between power input terminals PIT of the fluorescent lighting system will be as indicated by waveform Vx of FIG. 4g.

Additional Explanations and Comments (a) Depending upon the magnitude of the power line voltage, as well as on the exact values and adjustments of the various circuit and system components, there may be a net current flowing out of energy-storing capacitor ESC. However, any lost charge will automatically be replenished by way of auxiliary voltage transformer AVT and auxiliary rectifier Rax.

However, in most situations the voltage on energy-storing capacitor ESC will adjust itself to a point where no net charge will flow out of it or into it; which means that, in and for most situations, auxiliary voltage transformer AVT and auxiliary rectifier Rax may be eliminated.

Moreover, as indicated in FIG. 3, it is possible also to eliminate voltage transformer VT and to provide the requisite input voltage to control input terminals CIT1 from an extra winding on current transformer CT; in which case the complete control means (CM') becomes a completely self-contained two-terminal device.

(b) By adjusting the value of adjustable resistor AR, the magnitude of the load current can be correspondingly adjusted: a reduced value of AR requires an increased magnitude of load current to activate the Schmitt triggers.

(c) In some situations it might be undesirable to apply the relatively high-frequency squarewave voltage components of waveform Vx of FIG. 4g directly to the power input terminals (PIT) of a load; which load, of course, may not necessarily be a fluorescent lighting system. In those situations, much of the high-frequency components can be filtered away by placing an inductor in series with main terminals MT1/MT2.

(d) With the basic control means of FIGS. 1 and 3, depending only on the detailed design of the switching controller (SC), different forms of control patterns can readily be attained.

Basically, control means CM and/or CM' can at any time provide for: (i) the addition to the power line voltage of a fixed-magnitude voltage, (ii) the subtraction from the power line voltage of that same fixed-magnitude voltage, and (iii) the free passage of current to the load without adding or subtracting any voltage.

(e) In control means CM and CM' of FIGS. 1 and 3, respectively, energy-storing capacitor ESC is of such capacitance as to store an amount of energy that is large compared with the largest amount of energy it might have to absorb and/or deliver during any one complete half-cycle of the power line voltage.

However, in some circumstances it would be desirable to use an energy-storing capacitor of much smaller capacitance, thereby providing for a situation where the magnitude of the DC voltage on this capacitor would vary significantly in response to its normal inflows and outflows of current.

(f) The waveshape of the Ix-current of FIG. 4g has a much lower crest factor than that of the Io-current of FIG. 4b; which Io-current is the current that would be flowing to the fluorescent lighting system (FLS of FIGS. 1 or 3) if it were connected directly to the power line voltage of FIG. 4a.

The lower crest factor is desirable in terms of providing for improved efficacy in the operation of fluorescent lamps.

(The crest factor of a waveform is defined as the ratio between the peak and the RMS magnitudes of the waveform.)

(g) With reference to FIGS. 1 and 3, it is noted that the series-combination of source S and fluorescent lighting system FLS may be considered as a load for control means CM.

Or, from another viewpoint, the series-combination of source S and fluorescent lighting means FLM may be considered as a source of voltage having an internal impedance consisting of the series-combination of L, C and FL.

(h) The Vx-waveform of FIG. 4g has a fundamental frequency equal to that of power line voltage Vp1 of FIG. 4a.

(i) The peak magnitude of the Vx-current of FIG. 4g may be adjusted by way of adjustable resistor AR of FIGS. 1 and 3.

(j) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
 a source of ordinary electric utility power line voltage, the source having a pair of source terminals, the power line voltage being an alternating voltage having a period;
 a load means having a pair of load terminals; and
 control and connect means interposed between the source and the load means and operable to controllably permit current to flow therebetween, the control and connect means: (i) having a pair of main control terminals connected in series with the source terminals and the load terminals, and (ii) being operable to control the flow of current between the source and the load means by means of controllably and intermittently providing an auxiliary voltage across the main control terminals, thereby controllably and intermittently supplying or absorbing energy at its main control terminals, the absolute magnitude of the auxiliary voltage remaining substantially constant throughout the duration of several periods of the power line voltage.

2. The arrangement of claim 1 wherein the load means comprises a gas discharge lighting system.

3. The arrangement of claim 1 wherein the auxiliary voltage is provided across the main control terminals more frequently than twice each period of the power line voltage.

4. The arrangement of claim 1 wherein the load means comprises energy-storing means.

5. The arrangement of claim 1 wherein the control and connect means is operable to permit current to flow between the main control terminals while the auxiliary voltage is being provided thereacross.

6. The arrangement of claim 1 wherein energy may be absorbed by, as well as provided from, the control and connect means.

7. The arrangement of claim 1 wherein the control and connect means comprises adjustment means operative to permit adjustment of the magnitude of the current flowing between the source and the load means.

8. The arrangement of claim 7 wherein the current flowing between the source and the load means is substantially in phase with the power line voltage.

9. The arrangement of claim 1 wherein current flows between the source and the load means at all times as long as the instantaneous magnitude of the power line voltage is other than zero.

10. An arrangement comprising:
a pair of DC terminals having a DC voltage thereacross;
controllable inverter means connected with the DC terminals and operative to controllably provide an inverter voltage across a pair of inverter terminals, thereby to supply or absorb energy thereat;
a source providing ordinary electric utility power line voltage across a pair of power line terminals;
load means having a pair of load terminals; and
connect means operative to series-connect the inverter terminals, the power line terminals and the load terminals;
whereby the load means is provided with a voltage having an instantaneous magnitude that equals the sum of the instantaneous magnitudes of the power line voltage and the inverter voltage.

11. The arrangement of claim 10 wherein the inverter voltage is characterized as having a fundamental frequency, and wherein this fundamental frequency is substantially equal to that of the power line voltage.

12. The arrangement of claim 10 wherein the inverter means comprises a full bridge inverter.

13. The arrangement of claim 10 wherein the inverter means: (i) during certain periods draws energy from the source of DC voltage, and (ii) during certain other periods supplies energy to the source of DC voltage.

14. The arrangement of claim 13 wherein, when averaged over a complete period of the power line voltage, the net energy drawn by the inverter means from the source of DC voltage is very small in comparison with the net energy supplied from the source of power line voltage to the load means.

15. An arrangement comprising:
a source of ordinary electric utility power line voltage;
load means; and
control means: (i) connected between the source and the load means, thereby to form a series-combination of the source, the load means and the control means, (ii) having current sensor means sensing the instantaneous magnitude of any current flowing between the source and the load means, (iii) having current-limiting means, and (iv) operable, in response to said instantaneous magnitude, to control by way of feedback the magnitude of the current flowing therebetween, thereby to prevent it from exceeding a certain pre-established level.

16. The arrangement of claim 15 wherein said pre-established level is adjustable.

17. An arrangement comprising:
a source of voltage connected in series with a load means to form a series-combination, this series-combination being connected across a pair of source-load terminals;
an inverter means connected in circuit between a pair of DC terminals and a pair of AC terminals, an AC voltage being conditionally present at the AC terminals, a DC voltage being conditionally present at the DC terminals, the inverter means being controllably operative to deliver energy from the AC terminals to the DC terminals as well as from the DC terminals to the AC terminals; and
means to connect the inverter's AC terminals with the source-load terminals, thereby: (i) to indeed provide the AC voltage at the AC terminals, (ii) to indeed provide the DC voltage at the DC terminals, and (iii) controllably to draw current from the source through the load.

18. The arrangement of claim 17 wherein an energy-storing capacitor means is connected with the DC terminals.

19. The arrangement of claim 17 where the inverter means comprises a full-bridge inverter.

20. The arrangement of claim 17 wherein the source of voltage is an ordinary electric utility power line.

21. The arrangement of claim 17 wherein the load means comprises an inductive means.

22. The arrangement of claim 21 wherein the load means also comprises a gas discharge lamp means.

23. The arrangement of claim 17 wherein the magnitude of the DC voltage present at the DC terminals is substantially constant.

24. The arrangement of claim 17 where, over a period about equal to that of a complete cycle of the AC voltage on an ordinary electric utility power line, the amount of energy delivered to the DC terminals from the AC terminals is approximately equal to that delivered from the DC terminals to the AC terminals.

* * * * *